United States Patent
Okada et al.

(10) Patent No.: US 11,221,123 B2
(45) Date of Patent: Jan. 11, 2022

(54) LIGHTING CONTROL DEVICE FOR VEHICULAR LAMP, VEHICULAR LAMP SYSTEM

(71) Applicant: Stanley Electric Co., Ltd., Tokyo (JP)

(72) Inventors: Hidetaka Okada, Tokyo (JP); Toshiyuki Okuno, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 196 days.

(21) Appl. No.: 16/489,076

(22) PCT Filed: Feb. 20, 2018

(86) PCT No.: PCT/JP2018/005931
§ 371 (c)(1),
(2) Date: Aug. 27, 2019

(87) PCT Pub. No.: WO2018/155417
PCT Pub. Date: Aug. 30, 2018

(65) Prior Publication Data
US 2020/0070714 A1    Mar. 5, 2020

(30) Foreign Application Priority Data
Feb. 27, 2017   (JP) .............................. JP2017-035028

(51) Int. Cl.
*F21S 43/14*     (2018.01)
*H05B 47/10*    (2020.01)
(Continued)

(52) U.S. Cl.
CPC ............... *F21S 43/14* (2018.01); *B60Q 1/34* (2013.01); *H05B 45/10* (2020.01); *H05B 47/10* (2020.01);
(Continued)

(58) Field of Classification Search
None
See application file for complete search history.

(56) References Cited

U.S. PATENT DOCUMENTS

2003/0156422 A1   8/2003   Tatewaki et al.
2004/0150355 A1   8/2004   Tani et al.
(Continued)

FOREIGN PATENT DOCUMENTS

EP    1594 346 A2    11/2005
EP    3 473 494 A1    4/2019
(Continued)

OTHER PUBLICATIONS

International Search Report and Written Opinion of the International Search Report for PCT/JP2018/005931 dated Feb. 20, 2018.
(Continued)

*Primary Examiner* — Crystal L Hammond
(74) *Attorney, Agent, or Firm* — Kenealy Vaidya LLP

(57) ABSTRACT

To achieve visibility improvement and reduction of sense of incongruity in a vehicular lamp using LEDs. A lighting control device for controlling the on/off of a light source having a first and a second lamp unit each with LEDs including: a control part that generates a control signal for controlling the emitted lights of the lamp units; and a light source drive part for driving the lamp units based on the control signal; where the light emitted from the two lamp units driven by the light source driving part is such that each luminous intensity decreases from a first value to a second value which is smaller than the first value within a common period, and each luminous intensity decreases to the second value during the common period maintaining the relationship that the luminous intensity of the first lamp unit is lower than that of the second lamp unit.

9 Claims, 7 Drawing Sheets

(51) Int. Cl.
    *H05B 45/10*     (2020.01)
    *B60Q 1/34*     (2006.01)
    *H05B 47/155*     (2020.01)
    *H05B 47/16*     (2020.01)
    *H05B 47/165*     (2020.01)

(52) U.S. Cl.
    CPC .......... *H05B 47/155* (2020.01); *H05B 47/16* (2020.01); *H05B 47/165* (2020.01)

(56) References Cited

U.S. PATENT DOCUMENTS

| | | | |
|---|---|---|---|
| 2007/0120507 A1* | 5/2007 | Uchida | H05B 45/10 |
| | | | 315/360 |
| 2013/0162141 A1* | 6/2013 | Kanda | H05B 45/325 |
| | | | 315/77 |
| 2013/0293144 A1 | 11/2013 | Tomiyama et al. | |
| 2016/0219683 A1 | 7/2016 | Sugimoto et al. | |

FOREIGN PATENT DOCUMENTS

| | | |
|---|---|---|
| JP | 2007-287476 A | 11/2007 |
| JP | 2015-145224 A | 8/2015 |
| WO | 2018/155417 A1 | 8/2018 |

OTHER PUBLICATIONS

Extended European Search Report for the related European Patent Application No. 18758376.0 dated Dec. 8, 2020.

\* cited by examiner

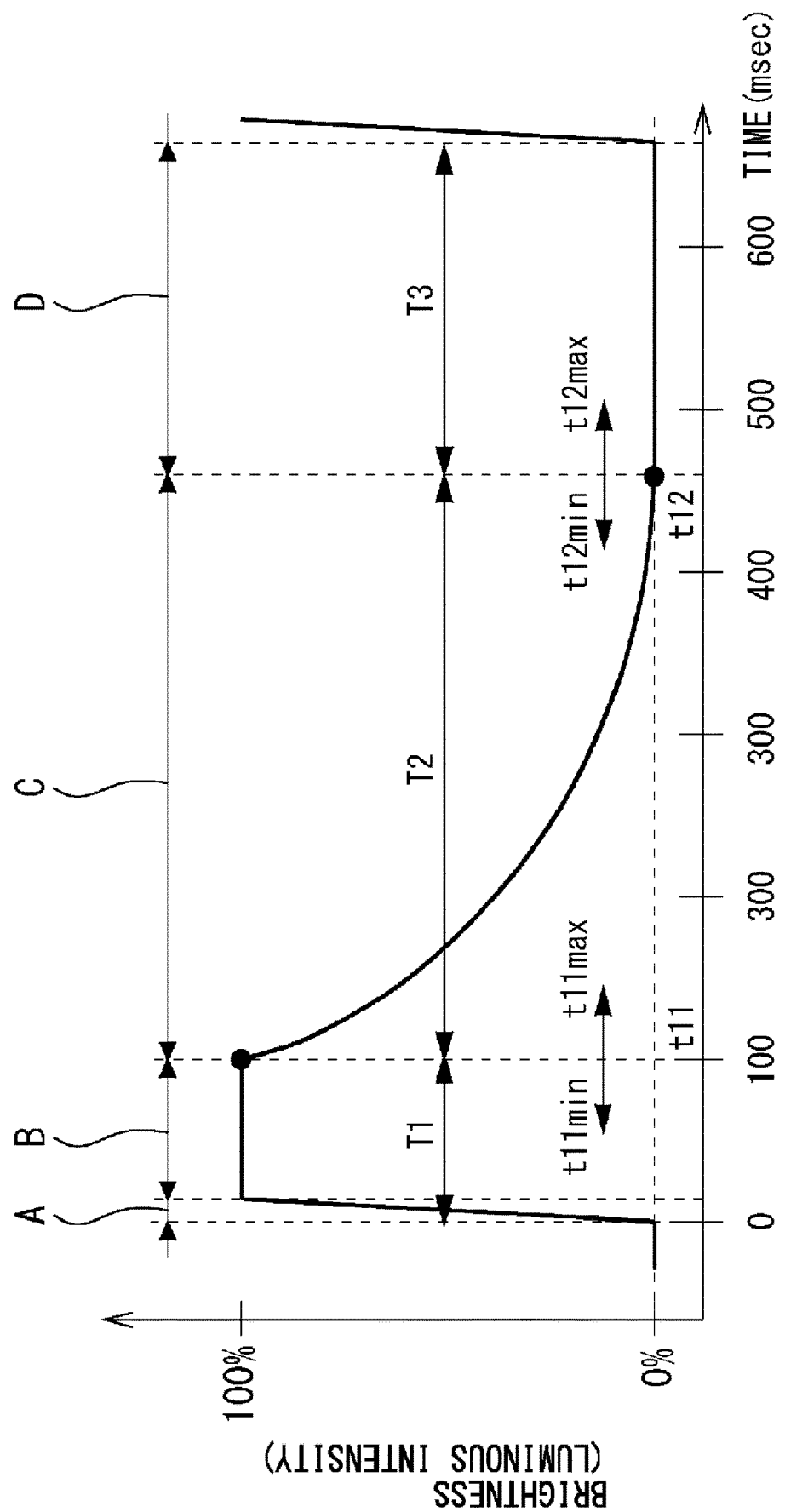

LIGHTING CONTROL DEVICE FOR VEHICULAR LAMP, VEHICULAR LAMP SYSTEM

CROSS-REFERENCE TO RELATED APPLICATIONS

This application is a U.S. National Stage Application under 35 U.S.C § 371 of International Patent Application No. PCT/JP2018/005931 filed Feb. 20, 2018, which claims the benefit of priority to Japanese Patent Application No. 2017-035028 filed Feb. 27, 2017, the disclosures of all of which are hereby incorporated by reference in their entireties.

BACKGROUND OF THE INVENTION

Field of the Invention

The present invention relates to a technique for controlling on/off of a vehicular lamp used in applications such as a direction indicator.

Description of the Background Art

A conventional example of a vehicular lamp used in an application of a direction indicator (turn signal lamp) is disclosed, for example, in Japanese Unexamined Patent Application Publication No. 2014-139941 (hereinafter referred to as Patent Document 1). This conventional example whose headlight or turn signal lamp etc. is configured using a plurality of LEDs is intended to reduce sense of incongruity felt by the observer due to the difference in luminance changing characteristics from the case of using a conventional bulb type lamp. Specifically, a lamp using the bulb type lamp has a luminance changing characteristics in which the rise of light emission is dull and the fall of light emission leaves a tail of mild light whereas a lamp using a plurality of LEDs does not have such luminance changing characteristics, thereby the above-described sense of incongruity felt by the observer occurs. Thus, in the conventional example disclosed in Patent Document 1, the plurality of LEDs is controlled to perform blinking with a light energy change that simulates the rise and fall of the light emission of the bulb type lamp (refer to paragraphs 0014 and 0015 of Patent Document 1).

Since semiconductor light emitting devices such as LEDs inherently have steep luminance changing characteristics, if the luminance changing characteristics are used properly, it is considered possible to achieve new expressions which could contribute to the improvement in visibility when used as a direction indicator or the like.

Unfortunately, the conventional example disclosed in Patent Document 1 only achieves the luminance changing characteristics simulating the bulb type lamp, and is thus no different from the bulb type lamp in terms of visibility improvement.

In a specific aspect, it is an object of the present invention to provide a technique capable of achieving both visibility improvement and reduction of sense of incongruity at the time of light emission of a vehicular lamp configured using a plurality of LEDs etc.

SUMMARY OF THE INVENTION

A lighting control device according to one aspect of the present invention is (a) a device for controlling the on/off of a light source having a plurality of lamp units each having a semiconductor light emitting element including: (b) a control part that generates and outputs a control signal for controlling emitted light of the plurality of lamp units of the light source; (c) a light source drive part for driving the plurality of lamp units of the light source based on the control signal provided from the control part; where (d) each of the plurality of lamp units has at least a first lamp unit and a second lamp unit, and where (e) the light emitted from the first lamp unit and the second lamp unit which is driven by the light source driving part based on the control signal is such that each luminous intensity decreases from a first value greater than zero to a second value which is smaller than the first value within a common period, and each luminous intensity gradually decreases to the second value during the entire time within the common period maintaining the relationship that the luminous intensity of the first lamp unit is lower than the luminous intensity of the second lamp unit.

According to the above configuration, it is possible to achieve both visibility improvement and reduction of sense of incongruity at the time of light emission of a vehicular lamp configured using a plurality of LEDs etc.

BRIEF DESCRIPTION OF THE DRAWINGS

FIG. 6 is a diagram showing in detail temporal change in the luminous intensity of the light emitted from the light source.

DESCRIPTION OF THE PREFERRED EMBODIMENTS

Figure 1:
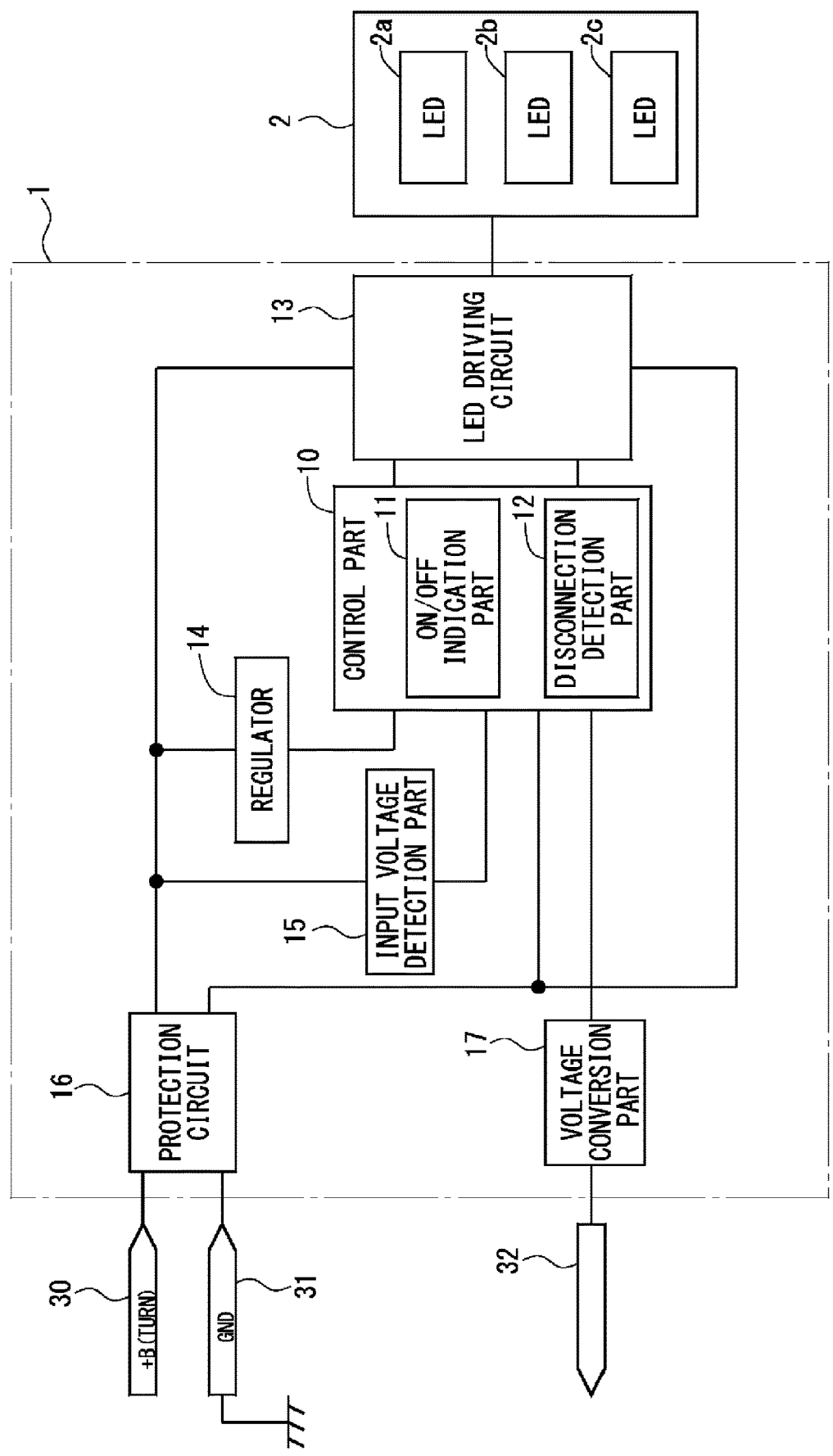
FIG. 1 is a diagram showing a configuration of a vehicular lamp system according to one embodiment.

FIG. 1 is a diagram showing a configuration of a vehicular lamp system according to one embodiment. The illustrated vehicular lamp system which is used as an a direction indicator of a vehicle is configured to include a lighting control device 1 and a light source 2 whose lighting is controlled by the lighting control device 1.

The lighting control device 1 is configured to include a control part 10, an LED driving circuit 13, a regulator 14, an input voltage detection part 15, a protection circuit 16, and a voltage conversion part 17. Further, the light source 2 is configured to include three lamp units (LED units) 2a, 2b and 2c, each of which includes one or more LEDs (semiconductor light emitting elements) and can be turned on and off independently.

The control part 10 is realized, for example, by having a microcomputer carry out a predetermined operation program and controls the entire operation of the lighting control device 1, and includes an on/off indication part 11 and a disconnection detection part 12 as functional blocks.

The on/off indication part 11 outputs a control signal for controlling the on/off state of the light source 2 to the LED driving circuit 13. Specifically, for example, if the LED drive circuit 13 controls the luminous intensity of the light source 2 in accordance with the value of the electric current, the on/off indication part 11 outputs a control signal indicating the electric current which corresponds to the desired luminous intensity. Further, if the LED driving circuit 13 drives the light source 2 by PWM (Pulse Width Modulation) control, the on/off indication part 11 provides the LED driving circuit 13 a variable pulse width control signal indicating the electric current value which corresponds to the desired luminous intensity.

If disconnection occurs in the circuit of the light source 2, the disconnection detection part 12 detects disconnection and outputs a disconnection detection signal to the on/off indication part 11. Upon receiving the disconnection detection signal, the on/off indication part 11 outputs a control signal to the LED drive circuit 13 for stopping the power supply to the light source 2, for example.

The LED driving circuit 13 uses a voltage (for example, a voltage supplied from the battery of the vehicle) supplied via a high potential terminal 30 and a reference potential terminal 31, and based on a control signal outputted from the on/off indication part 11, supplies a driving power to the light source 2 to turn on and off the LED units 2a, 2b and 2c of the light source 2 at a desired luminous intensity. The LED driving circuit 13 drives the light source 2 with the electric current whose value corresponds to the control signal, for example. Further, the LED driving circuit 13 may drive the light source 2 by PWM control.

The regulator 14 converts the voltage supplied via the high potential terminal 30 and the reference potential terminal 31 into a low potential voltage (for example, +5 V) suitable for the operation of the control part 10 and supplies it to the control part 10. The regulator 14 has a built-in watchdog timer for monitoring the abnormal operation of the control part 10.

The input voltage detection part 15 detects the voltage supplied via the high potential terminal 30 and the reference potential terminal 31 when it falls below a predetermined voltage, and outputs a detection signal to the control part 10.

The protection circuit 16 is connected to the high potential terminal 30 and the reference potential terminal 31, and provides protection when the light source 2 is reversely connected, or prevents surge voltage from being inputted to the lighting control device 1 or the light source 2.

The voltage conversion part 17 converts the voltage of the disconnection detection signal into a predetermined value and outputs the voltage to the terminal 32 when the disconnection detection signal is outputted from the disconnection detection part 12. The disconnection detection signal outputted to the terminal 32 is used to turn on a warning light provided on the instrument panel of the vehicle, for example.

FIGS. 2A to 2F are plan views schematically showing the structure of the light source. In the light source 2 of the structural example shown in FIG. 2A, a circular lamp unit 2a is disposed at the innermost side, an annular lamp unit 2b is disposed to surround the outer side of the circular lamp unit 2a, and an annular lamp unit 2c is disposed to further surround the outer side of the annular lamp unit 2b. Similarly, in the light source 2 of the structural example shown in FIG. 2B, a triangular lamp unit 2a is disposed at the innermost side, a triangular annular lamp unit 2b is disposed to surround the outer side of the triangular lamp unit 2a, and a triangular annular lamp unit 2c is disposed to further surround the outer side of the triangular annular lamp unit 2b. Similarly, in the light source 2 of the structural example shown in FIG. 2C, a square lamp unit 2a is disposed at the innermost side, a square annular lamp unit 2b is disposed to surround the outer side of the square lamp unit 2a, and a square annular lamp unit 2c is disposed to further surround the outer side of the square lamp unit 2b. Here, in addition to the above examples, the light source 2 can be configured to include an oval or a polygon shaped lamp unit 2a disposed at the innermost side and annular lamp units 2b and 2c disposed outward so as to surround the lamp unit 2a.

Figure 2A:
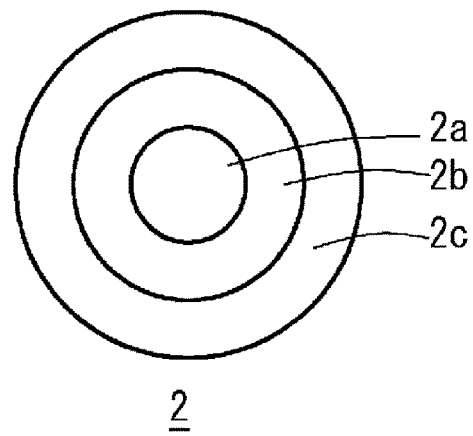
FIGS. 2A to 2F are plan views schematically showing the structure of the light source.
Figure 2B:
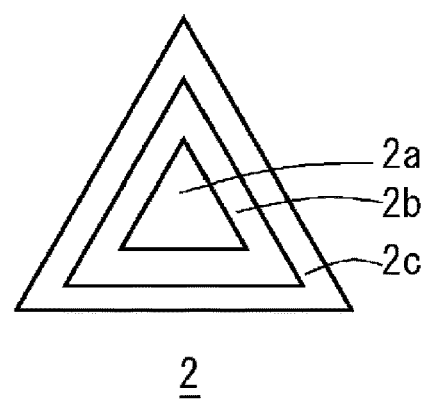
Figure 2C:
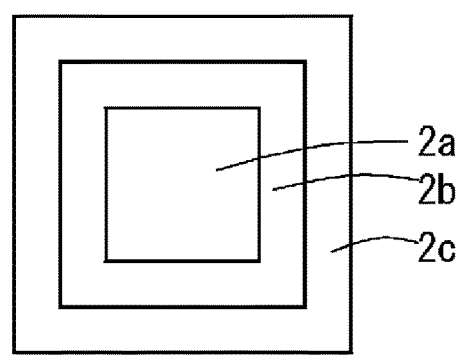
Figure 2D:
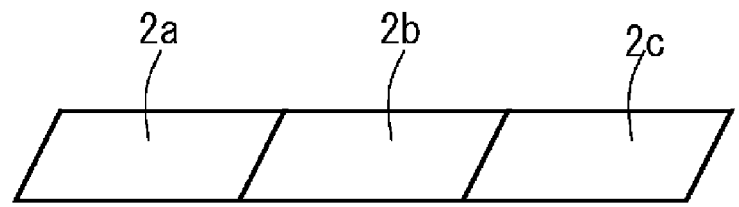

In the light source 2 of the structural example shown in FIG. 2D, parallelogram-shaped lamp units 2a, 2b and 2c are arranged in the horizontal direction. In the light source 2 of the structural example shown in FIG. 2E, parallelogram-shaped lamp units 2a, 2b and 2c are arranged in the vertical direction. Further, in the light source 2 of the structural example shown in FIG. 2F, parallelogram-shaped lamp units 2a and 2b are arranged in the horizontal direction, and a parallelogram-shaped lamp unit 2c is arranged in the upper direction of the lamp unit 2b, and the lamp units 2a to 2c are arranged in an inverted L shape as a whole. Here, the structure shown in FIG. 2F may be disposed to the left and right of a vehicle by preparing lamp units having left-right symmetry. Further, in addition to these examples, the lamp units 2a to 2c may be arranged in an oblique direction. Further, the shape of each of the lamp units 2a to 2c is not limited to parallelogram but may be arbitrarily determined, such as a rectangle or a square.

Figure 3A:
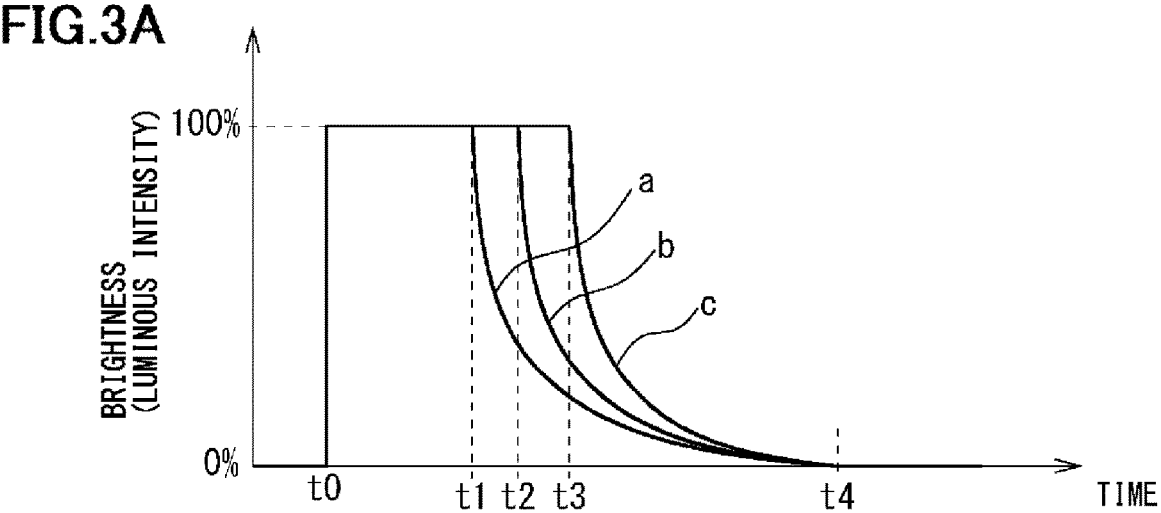
FIGS. 3A to 3C are diagrams each showing temporal change in the luminous intensity of the light emitted from the light source.
Figure 3B:
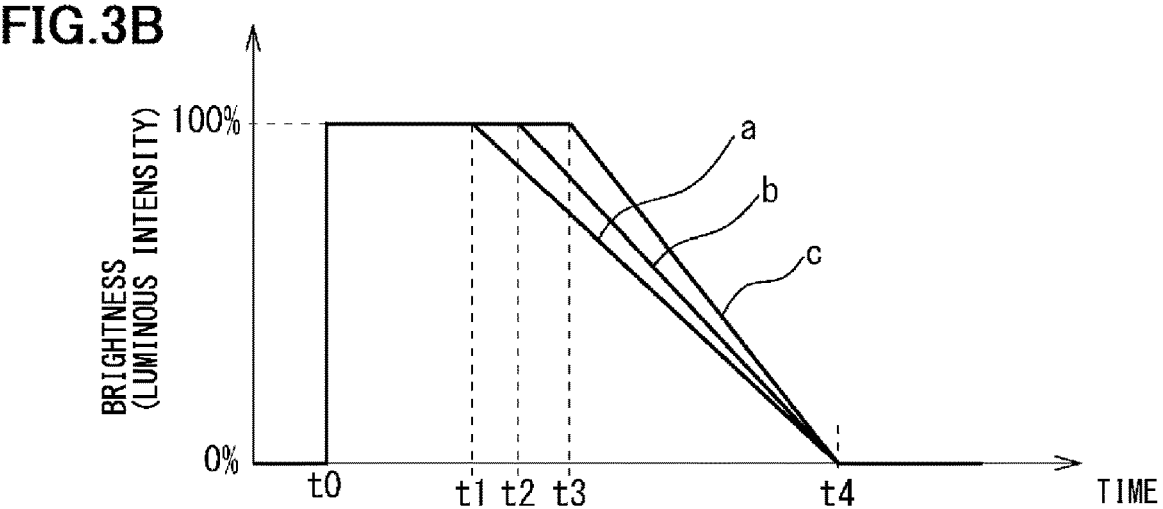
Figure 3C:
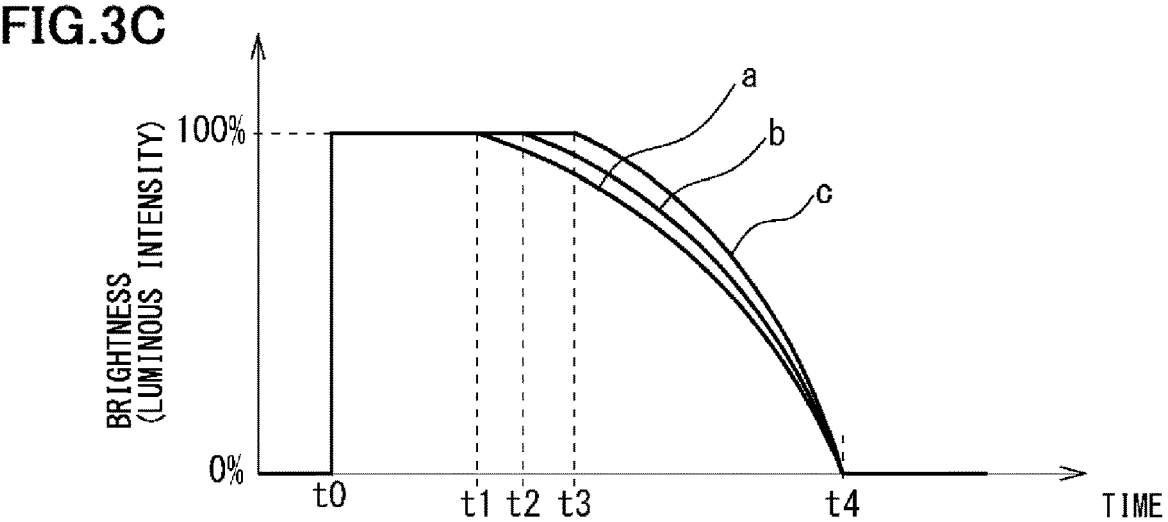

FIGS. 3A to 3C are diagrams each showing temporal change in the luminous intensity of the light emitted from the light source. In this embodiment, the lamp units 2a to 2c of the light source 2 are individually driven by driving the light source 2 by the LED drive circuit 13. Each of the lamp units 2a to 2c is driven to periodically and repeatedly blink, and in each of FIGS. 3A to 3C, a cycle of the luminous intensity change of the periodically blinking light is shown. In the present embodiment, a range of 1 Hz to 2 Hz is assumed as a repetition frequency of the light, and one cycle in this case is from 0.5 seconds to 1 second (from 500 milliseconds to 1000 milliseconds).

Here, in the present specification, the term "luminous intensity 100%" refers to a state where the luminous intensity set to the maximum value is emitted at the time of the normal lighting on/off operation in each lamp unit 2a etc. of the light source 2, and for example, it refers to a state in which the rated maximum luminous intensity is emitted, in each lamp unit 2a etc. of the light source 2. Further, in the present specification, "luminous intensity 0%" refers to a state where each lamp unit 2a etc. is turned off at the time of the lighting on/off operation in each lamp unit 2a etc. of the light source 2, and for example, it refers to a state in which the luminous intensity of each lamp unit 2a etc. of the light source 2 is zero, but other than such state, it may include a state in which the luminous intensity is low enough that human eyes cannot perceive the lighting.

The graph of the temporal change in the luminous intensity of the emitted light shown in FIG. 3A includes three waveforms a, b and c. In detail, waveform a shows the temporal change in the luminous intensity of the emitted light from the lamp unit 2a, waveform b shows the temporal change in the luminous intensity of the emitted light from the lamp unit 2b, and waveform c shows the temporal change in the luminous intensity of the emitted light from the lamp unit 2c. In FIG. 3A, as shown by waveforms a to c, each of the lamp units 2a to 2c rises up to 100% in luminous intensity (brightness) at a certain time point t0. Thereafter, the lamp unit 2a is driven so as to maintain luminous intensity 100% until time point t1, the lamp unit 2b is driven so as to maintain luminous intensity 100% until time point t2, and the lamp unit 2c is driven so as to maintain luminous intensity 100% until time point t3.

Thereafter, at or after time point t1, the lamp unit 2a is driven so that the luminous intensity of its emitted light gradually decreases from 100%. Further, after time point t1 and at or after time point t2, the lamp unit 2b is driven so that the luminous intensity of its emitted light gradually decreases from 100%. Furthermore, after time point t2 and at or after time point t3, the lamp unit 2c is driven so that the luminous intensity of its emitted light gradually decreases from 100%. After time point t3, the lamp units 2a to 2c are driven so that the luminous intensity of each emitted light reaches 0% at time point t4, and then the luminous intensity is maintained at 0% for a predetermined period of time. In this embodiment, the period from time point t1 to time point t4 is referred to as the "common period".

Here, the three waveforms a, b and c shown in the graphs of the temporal change in the luminous intensity of the emitted light in FIGS. 3B and 3C are basically similar to FIG. 3A. In each of the waveforms a, b and c shown in FIG. 3A, the luminous intensity decreases relatively sharply immediately after starting to decrease from each of the time points t1, t2 and t3, and thereafter the luminous intensity decreases gradually. In each of the waveforms a, b and c shown in FIG. 3B, the luminous intensity decreases linearly with a constant slope immediately after starting to decrease from each of the time points t1, t2 and t2. Further, in each of the waveforms a, b, and c shown in FIG. 3C, the luminous intensity decreases relatively gradually immediately after starting to decrease from each of the time points t1, t2, and t3, and then the luminous intensity decreases relatively sharply.

As described above, the lamp units 2a to 2c in this embodiment each differs in the time points at which the luminous intensity of each emitted light starts to decrease from 100% to a lower value, but the time points at which the luminous intensity of the emitted light reaches 0% are the same. And at any time during the common period, the relationship that the emitted light intensity of the lamp unit 2a is lower than that of the lamp unit 2b, and the emitted light intensity of the lamp unit 2b is lower than that of the lamp unit 2c is maintained.

As a result of such driving conditions, when the configuration of each lamp unit 2a to 2c is as shown in any of FIGS. 2A to 2C, since the luminous intensity of the emitted light sequentially decreases from the inner (central) lamp unit 2a to the outer lamp unit 2c, the light is visually recognized as if it falls to the center. Here, when the driving conditions of the lamp unit 2a and the lamp unit 2c are interchanged with each other, since the luminous intensity of the emitted light sequentially decreases from the outer lamp unit 2c to the inner lamp unit 2a, the light is visually recognized as if it falls to the outside. In either case, none of the three lamp units 2a to 2c is turned off sooner than the others, and the above-described visual effects are achieved while all the lamp units maintain the light-on state until time point t4.

Further, when the configuration of each lamp unit 2a to 2c is as shown in FIG. 2D, since the luminous intensity of the emitted light sequentially decreases from the lamp unit 2a on the left side to the lamp unit 2c on the right side, the light is visually recognized as if the light flows from the left to the right. Here, when the driving conditions of the lamp unit 2a and the lamp unit 2c are interchanged with each other, since the luminous intensity of the emitted light sequentially decreases from the lamp unit 2c on the right side to the lamp unit 2a on the left side, the light is visually recognized as if it flows from the right to the left. In either case, none of the three lamp units 2a to 2c is turned off sooner than the others, and the above-described visual effects are achieved while all the lamp units maintain the light-on state until time point t4.

Figure 2E:
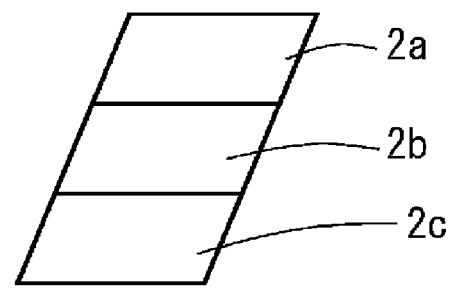

Similarly, when the configuration of each lamp unit 2a to 2c is as shown in FIG. 2E, since the luminous intensity of the emitted light sequentially decreases from the lamp unit 2a on the upper side to the lamp unit 2c on the lower side, the light is visually recognized as if it flows from the top to the bottom. Here, when the driving conditions of the lamp unit 2a and the lamp unit 2c are interchanged with each other, since the luminous intensity of the emitted light sequentially decreases from the lamp unit 2c on the lower side to the lamp unit 2a on the upper side, the light is visually recognized as if it flows from the bottom to the top. In either case, none of the three lamp units 2a to 2c is turned off sooner than the others, and the above-described visual effects are achieved while all the lamp units maintain the light-on state until time point t4.

Figure 2F:
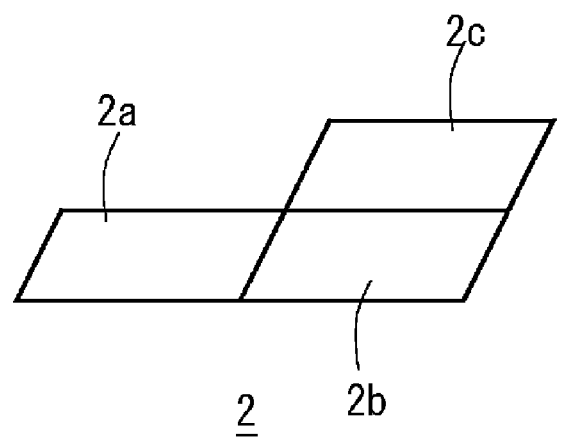

Similarly, when the configuration of each lamp unit 2a to 2c is as shown in FIG. 2F, since the luminous intensity of the emitted light sequentially decreases from the lamp unit 2a on the lower left side to the lamp unit 2c on the upper right side, the light is visually recognized as if it flows from the lower left to the upper right in a reverse L shape. Here, when the driving conditions of the lamp unit 2a and the lamp unit 2c are interchanged with each other, since the luminous intensity of the emitted light sequentially decreases from the lamp unit 2c on the upper right side to the lamp unit 2a on the lower left side, the light is visually recognized as if it flows from the top to the bottom in a reverse L shape. In either case, none of the three lamp units 2a to 2c is turned off sooner than the others, and the above-described visual effects are achieved while all the lamp units maintain the light-on state until time point t4.

Figure 4A:
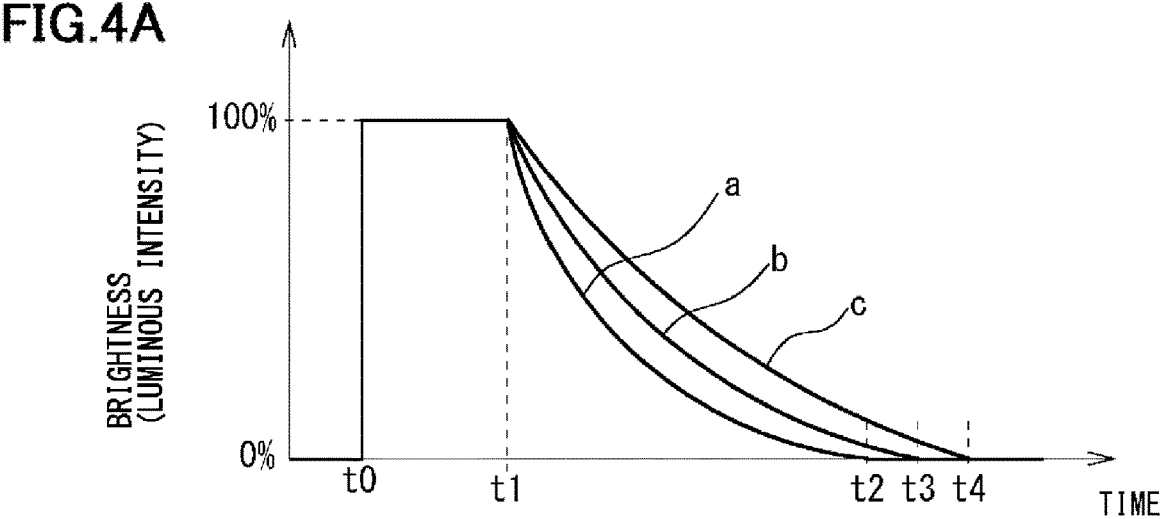
FIGS. 4A to 4C are diagrams each showing temporal change in the luminous intensity of the light emitted from the light source.
Figure 4B:
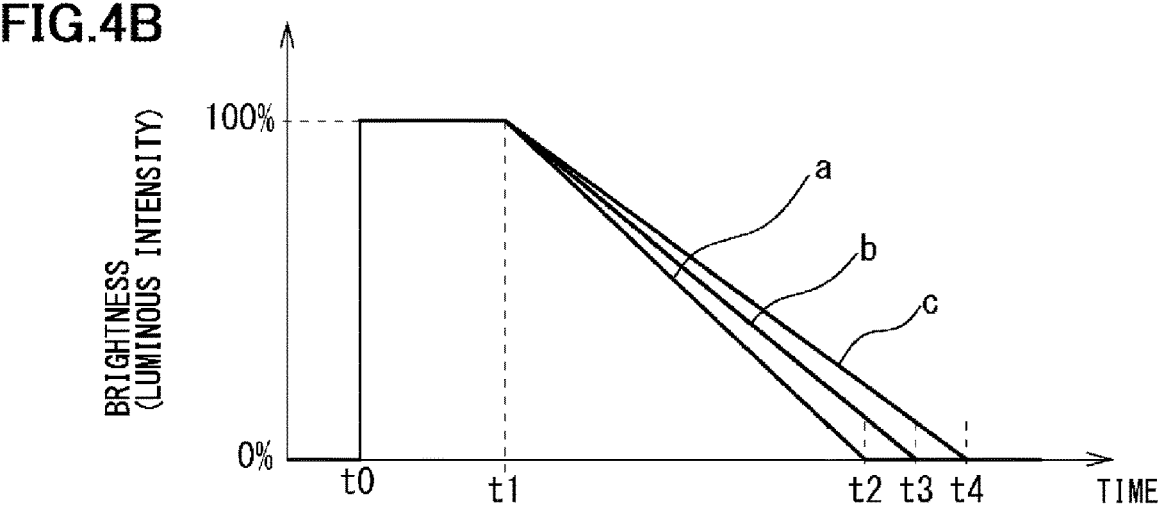
Figure 4C:
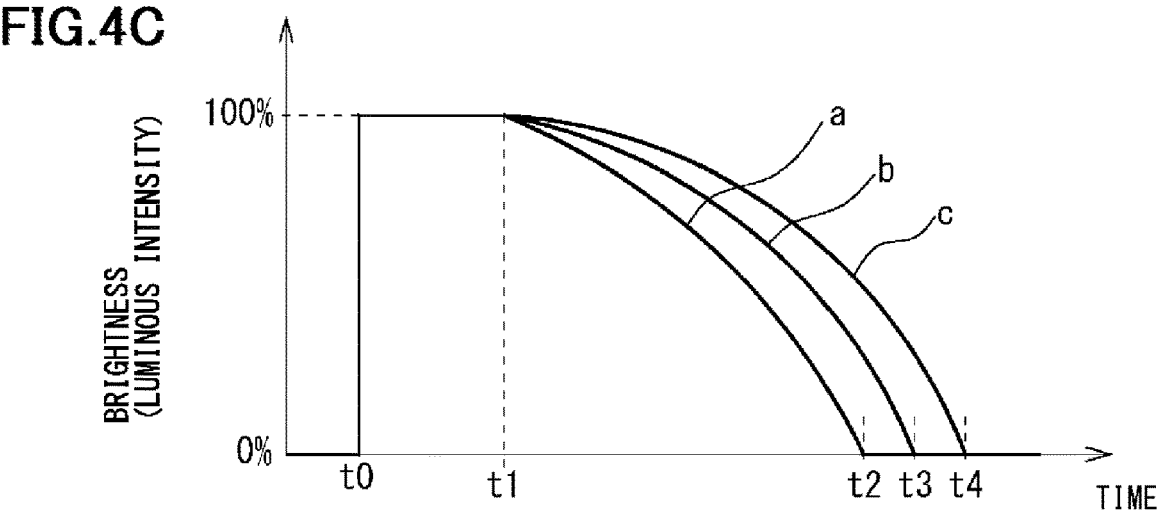

FIGS. 4A to 4C are diagrams each showing temporal change in the luminous intensity of the light emitted from the light source. Also, in each of FIGS. 4A to 4C, a cycle of the luminous intensity change of the periodical blinking light is shown. In the embodiment shown in FIGS. 3A to 3C described above, the time points at which the luminous intensity of the emitted light starts to decrease from 100% are different and the time points at which the luminous intensity reaches 0% are the same, but the embodiment shown in FIGS. 4A to 4C are the opposite in that the time point at which the luminous intensity of the outgoing light starts to decrease from 100% are the same and the time points at which the luminous intensity reaches 0% are different.

Specifically, the graph of the temporal change in the luminous intensity of the emitted light shown in FIG. 4A includes three waveforms a, b and c. And, waveform a shows the temporal change in the luminous intensity of the light emitted from the lamp unit 2a, waveform b shows the temporal change in the luminous intensity of the light emitted from the lamp unit 2b, and waveform c shows the temporal change in the luminous intensity of the light emitted from the lamp unit 2c. In FIG. 4A, as shown by waveforms a to c, each of the lamp units 2a to 2c rises up to 100% in luminous intensity (brightness) at a certain time point t0. Thereafter, all of the lamp units 2a to 2c are driven to maintain luminous intensity 100% until time point t1.

Thereafter, at or after time point t1, the lamp units 2a to 2c are all driven so that the luminous intensity of the emitted light decreases gradually from 100%, that is, the lamp units are driven to decrease the luminous intensity little by little. Then, lamp unit 2a is driven so that the luminous intensity of the emitted light reaches 0% at time point t2 which is at or after time point t1, and thereafter the luminous intensity is maintained at 0% for a predetermined period. Further, lamp unit 2b is driven so that the luminous intensity of the emitted light reaches 0% at time point t3 which is at or after time point t2, and thereafter the luminous intensity is maintained at 0% for a predetermined period. Further, lamp unit 2c is driven so that the luminous intensity of the emitted light reaches 0% at time point t4 which is at or after time point t3, and thereafter the luminous intensity is maintained at 0% for a predetermined period. In this embodiment, the period from time point t1 to time point t4 is referred to as the "common period".

Here, the three waveforms a, b and c in the graphs of the temporal change in the luminous intensity of the emitted light shown in FIG. 4B and FIG. 4C are basically similar to FIG. 4A. In each of the waveforms a, b and c shown in FIG. 4A, the luminous intensity decreases relatively sharply immediately after starting to decrease at time point t1, and thereafter the luminous intensity decreases gradually. In each of the waveforms a, b, and c shown in FIG. 4B, the luminous intensity decreases linearly with a constant slope immediately after starting to decrease at time point t1. Further, in each of the waveforms a, b, and c shown in FIG. 4C, the luminous intensity decreases relatively gradually immediately after starting to decrease at time point t1, and then the luminous intensity decreases relatively sharply.

As described above, the lamp units 2a to 2c in this embodiment have the same time point at which the luminous intensity of each emitted light starts to decrease from 100% to a lower value, but the time points at which the luminous intensity of the emitted light reaches 0% are different. And at any time during the common period, the relationship that the intensity of the light emitted from the lamp unit 2a is lower than that of the lamp unit 2b, and the intensity of the emitted light of the lamp unit 2b is lower than that of the lamp unit 2a is maintained.

As a result of such driving conditions, when the configuration of each lamp unit 2a to 2c is as shown in any of FIGS. 2A to 2C, since the luminous intensity of the emitted light sequentially decreases from the inner (central) lamp unit 2a to the outer lamp unit 2c, the light is visually recognized as if it falls to the center. Here, when the driving conditions of the lamp unit 2a and the lamp unit 2c are interchanged with each other, since the luminous intensity of the emitted light sequentially decreases from the outer lamp unit 2c to the inner lamp unit 2a, the light is visually recognized as if it falls to the outside.

Further, when the configuration of each lamp unit 2a to 2c is as shown in FIG. 2D, since the luminous intensity of the emitted light sequentially decreases from the lamp unit 2a on the left side to the lamp unit 2c on the right side, the light is visually recognized as if it flows from the left to the right. Here, when the driving conditions of the lamp unit 2a and the lamp unit 2c are interchanged with each other, since the luminous intensity of the emitted light sequentially decreases from the lamp unit 2c on the right side to the lamp unit 2a on the left side, the light is visually recognized as if it flows from the right to the left.

Similarly, when the configuration of each lamp unit 2a to 2c is as shown in FIG. 2E, since the luminous intensity of the emitted light sequentially decreases from the lamp unit 2a on the upper side to the lamp unit 2c on the lower side, the light is visually recognized as if it flows from the top to the bottom. Here, when the driving conditions of the lamp unit 2a and the lamp unit 2c are interchanged with each other, since the luminous intensity of the emitted light sequentially decreases from the lamp unit 2c on the lower side to the lamp unit 2a on the upper side, the light is visually recognized as if it flows from the bottom to the top.

Similarly, when the configuration of each lamp unit 2a to 2c is as shown in FIG. 2F, since the luminous intensity of the emitted light decreases in order from the lamp unit 2a on the lower left side to the lamp unit 2c on the upper right side, the light is visually recognized as if it flows from the lower left to the upper right in a reverse L shape. Here, when the driving conditions of the lamp unit 2a and the lamp unit 2c are interchanged with each other, since the luminous intensity of the emitted light sequentially decreases from the lamp unit 2c on the upper right side to the lamp unit 2a on the lower left side, the light is visually recognized as if it flows from the top to the bottom in a reverse L shape.

Figure 5A:
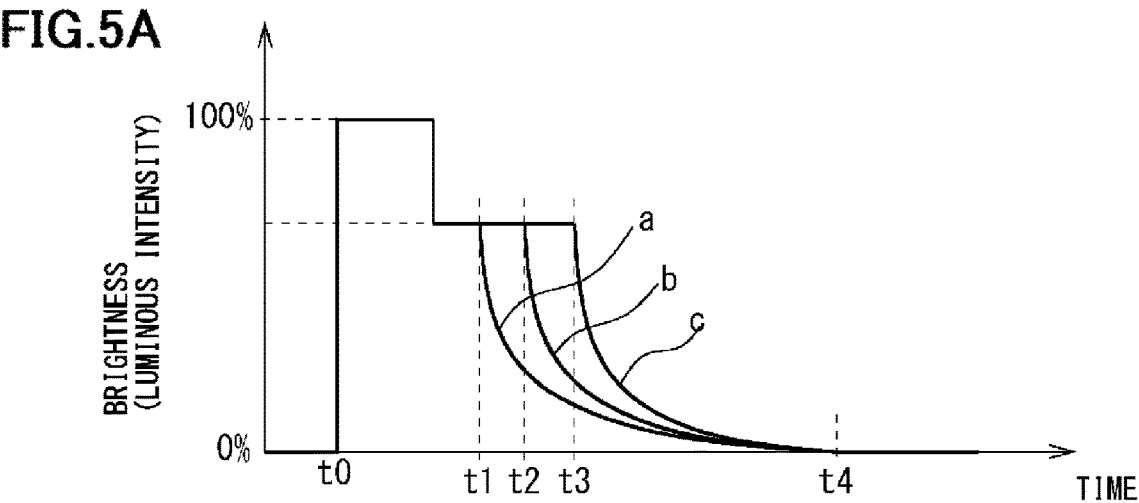
FIGS. 5A to 5C are diagrams each showing temporal change in the luminous intensity of the light emitted from the light source of a modified example.
Figure 5B:
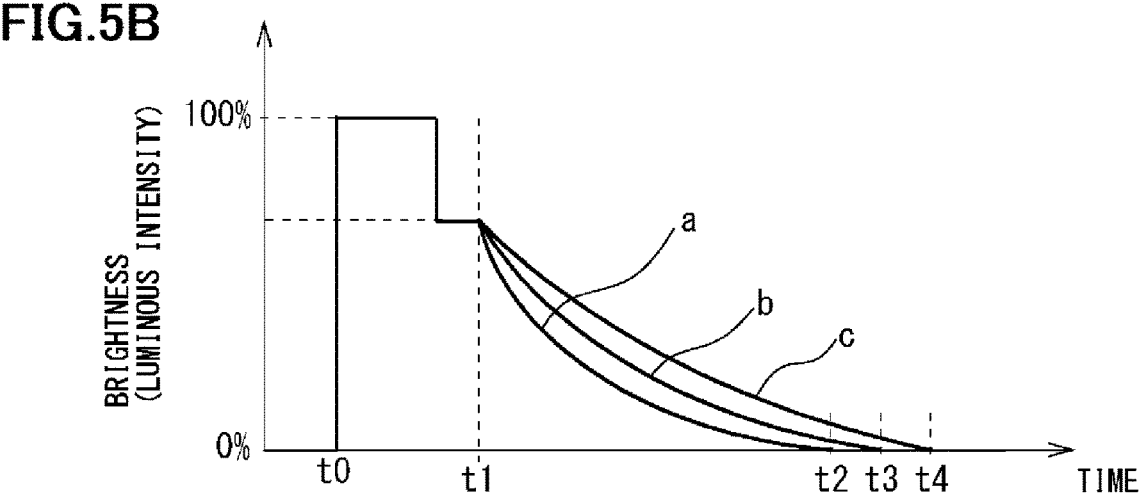
Figure 5C:
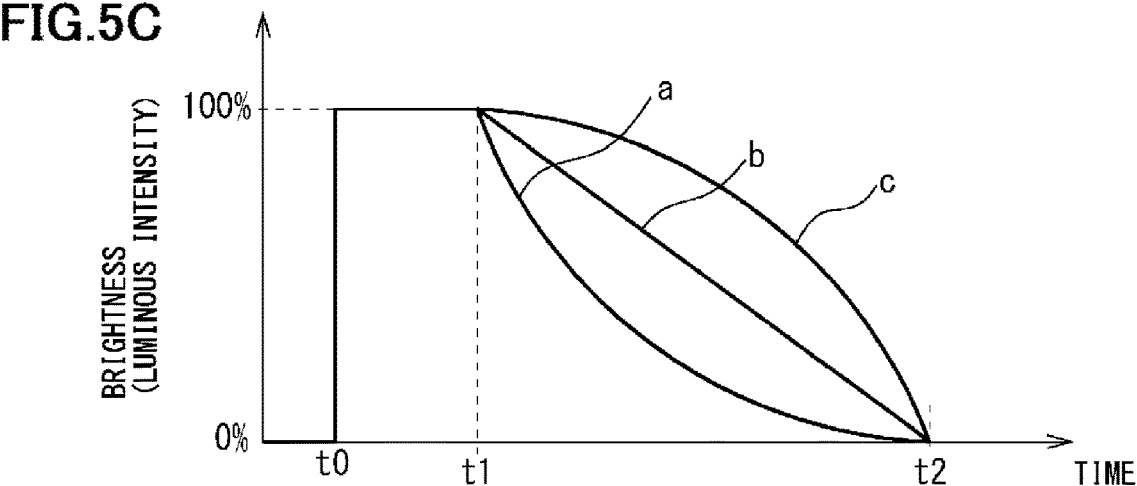

FIGS. 5A to 5C are diagrams each showing temporal change in the luminous intensity of the light emitted from the light source of a modified example. In each of the waveforms a to c shown in FIGS. 3A to 3C described above, the luminous intensity was decreased from the state of luminous intensity 100% with a time difference to reach the luminous intensity 0% simultaneously. In contrast, in FIG. 5A, as illustrated, after the luminous intensity is decreased to an arbitrary value (magnitude) lower than 100%, the luminous intensity may be decreased from the state of the arbitrary luminous intensity, with a time difference to reach the luminous intensity 0% simultaneously. Similarly, in each of the waveforms a to c shown in FIGS. 4A to 4C described above, the luminous intensity was decreased simultaneously from the state of luminous intensity 100% to reach the luminous intensity 0% with a time difference. In contrast, in FIG. 5B, as illustrated, after the luminous intensity is set to an arbitrary value (magnitude) lower than 100%, the luminous intensity may be decreased simultaneously from the state of the arbitrary luminous intensity to reach the luminous intensity 0% with a time difference.

Further, as illustrated in FIG. 5C, while having the same time point where the luminous intensity is decreased from 100% (or an arbitrary value lower than 100%) and also having the same time point where the luminous intensity reaches 0%, the manner in which the luminous intensity changes may be made different for each of the lamp units 2a to 2c. Specifically, as illustrated in waveforms a, b, and c in FIG. 5C, the luminous intensity decreases relatively sharply from time point t1 and decreases gradually thereafter in waveform a, the luminous intensity decreases linearly at a constant slope from time point t1 in waveform b, and the luminous intensity decreases relatively gradually from time point t1 and decreases relatively sharply thereafter in waveform c. In this embodiment, the period from time point t1 to time point t2 is referred to as the "common period".

By comparing the waveforms a and b shown in FIGS. 5A to 5C, it can be seen that the luminous intensity of the lamp unit 2a decreases relatively quickly while the luminous intensity of the lamp unit 2b decreases relatively slowly. Similarly, by comparing the waveforms b and c, it can be seen that the luminous intensity of the lamp unit 2b decreases relatively quickly while the luminous intensity of the lamp unit 2c decreases relatively slowly. Further, by comparing the waveforms a and c, it can be seen that the luminous intensity of the lamp unit 2a decreases relatively quickly while the luminous intensity of the lamp unit 2c decreases relatively slowly.

As described above, in each of the lamp units 2a to 2c in this modified example, the time points at which the luminous intensity of each emitted light starts to drop from 100% to a lower value is the same and the time points where the luminous intensity of each emitted light reaches 0% are also the same. Further, at any time during the common period, the relationship where the intensity of the light emitted from the lamp unit 2a is lower than that of the lamp unit 2b and the intensity of the emitted light of the lamp unit 2b is lower than that of the lamp unit 2c is maintained.

As a result of such driving conditions, it possible to decrease the luminous intensity of the lamp unit 2a relatively quickly, and then to decrease the luminous intensity of the lamp unit 2b quickly, and to decrease the luminous intensity of the lamp unit 2c in the slowest manner. Thereby, a difference in luminous intensity of the emitted light of each of the lamp units 2a to 2c can be created to obtain the same visual effect as described above.

FIG. 6 is a diagram showing in detail an example of temporal change in the luminous intensity of the light emitted from the light source. For each of the waveforms a to c shown in FIGS. 3A to 5C described above, it is also preferable to implement the waveform whose temporal change is shown in FIG. 6, for example. Specifically, the waveform shown in FIG. 6 is composed of waveform sections A, B, C, and D, and have the following features.

Section A is a section in which the luminous intensity changes from 0% to 100% (or an arbitrary value) substantially instantaneously from the start point (at 0 second) of one cycle. In detail, section A corresponds to a rise time which is inevitably generated when the luminous intensity of the emitted light of each lamp unit 2a etc. of the light source 2 reaches from 0% to 100% due to factors such as circuit operation time lag.

Since the time required for section A is mainly the time corresponding to the rise time of light emission of the LEDs included in the light source 2, it is extremely shorter than the time corresponding to one cycle. Specifically, in the present embodiment, for example, the repetition frequency of light is assumed to be in the range of 1 Hz to 2 Hz, and in this case, one cycle becomes 0.5 seconds to 1 second (500 milliseconds to 1000 milliseconds). In contrast, the time of section A is about several hundred microseconds to one millisecond, for example. That is, the time of section A is set to $\frac{1}{500}$ or less of one cycle.

Section B is the section following Section A, and is the section in which the state is maintained after the luminous intensity of the light emitted from each lamp unit 2a etc. of the light source 2 reaches 100% (or an arbitrary value lower than 100%). Section B starts from the end point of Section A, and continues until time point t11 which is a predetermined end point. Here, although it is conceivable that the actual luminous intensity fluctuates due to power supply fluctuation, even if such intrinsically unintended fluctuation in luminous intensity occurs, the state of luminous intensity 100% shall be deemed to be maintained. Specifically, when the luminous intensity is maintained within the range of ±10% on the basis of the maximum value of the luminous intensity set at the time during which each lamp unit 2a etc. of the light source 2 is blinking, the state of luminous intensity 100% shall be assumed.

Section C is the section following Section B and is the section in which the luminous intensity of the light emitted from each lamp unit 2a etc. of the light source 2 gradually decreases from 100% to 0%. Section C starts from time point t11 which is the end point of Section B and continues until time point t12 which is a predetermined end point. As shown in the figure, it is preferable that the time length of Section C is longer than the total time length of Sections A and B, and it is preferable to set the time length of Section C to be equal to or greater than three times of the total time length of Sections A and B. Here, in the example shown in the figure, in Section C, the change in luminous intensity forms a curved line where the decrease rate of the luminous intensity at the starting point is large and the decrease rate gradually decreases toward the end point of the section, but is not limited thereto. For example, the change in luminous intensity may form a curved line where the decrease rate of the luminous intensity at the starting point is small and the decrease rate increases toward the end point of the section, or the change in luminous intensity may form a straight line where the decrease rate is constant.

Section D is the section following Section C, and is the section in which the state where luminous intensity 0% is maintained after the light emitted from each lamp unit 2a etc. of the light source 2 reaches that state (the state of luminous intensity 0%). Section D starts from time point t12 which is the end point of Section C and continues until the end point of one cycle. After the end point of Section D, Section A of the next cycle follows.

The features of luminous intensity change of one cycle shown in FIG. 6 are as follows. Firstly, in Section A and Section B, utilizing the steepness of rise in light emission which is the intrinsic feature of each LED included in each lamp unit 2a etc. of the light source 2, the luminous intensity is promptly set to the state of luminous intensity 100% and this state is maintained. Thereby, it is possible to obtain visibility equivalent to that of a turn signal lamp using the conventional LEDs. That is, it is possible to allow the observer to notice the turn signal lamp sooner.

Here, in a turn signal lamp that drives LEDs by using a simple rectangular wave as a driving method, since the state of luminous intensity 100% continues from the turn-on time till the turn-off time, the total amount of light within one cycle (the integrated value of the amount of light) becomes large which makes the observer feel a strong glare when viewing the lamp. In contrast, in Section C, since the luminous intensity is gradually decreased from 100% to 0%, the glare is reduced. Thus, it is possible to realize an eye friendly blinking state for the observer. Furthermore, since a period maintaining the state of luminous intensity 0% is provided in Section D, Section A in the following cycle (the section where the lamp is turned on instantaneously) becomes more distinguishable and the blinking becomes easier to recognize. Thus, it is possible to realize a more eye friendly blinking state for the observer.

Further, when viewing Sections A to D as a whole, since the luminous intensity gradually decreases over a relatively long time after the luminous intensity steeply rises, unlike the conventional luminous intensity change of the turn signal lamp using a plurality of LEDs, a new blinking light emission expression which is different from the luminous intensity change of a turn signal lamp using light bulbs or a turn signal lamp imitating the light bulbs is realized.

Next, a sensory evaluation result regarding preferred values of the time length of each section of luminous intensity change is described briefly. Here, the preferred values for the time length of each section were evaluated by seven evaluators. In the evaluation, the time length of each section was set variably and the minimum time unit was set to 10 ms. In addition, the maximum value and the minimum value among the sets of data obtained from each of the seven evaluators were excluded and five data were used to calculate the average. Also, reference values at time t11 and time t12 in the luminous intensity change were set to 100 ms and 460 ms, respectively. Further, the time length required for Section A was about 0.2 ms. Further, in the following evaluation, one cycle was set to 667 ms which corresponds to a frequency of 1.5 Hz.

Time t11min is the result of evaluating the preferred minimum value at the end time point t11 of Section B (the second section). Here, time point t11 was decreased from 100 ms in increments of 10 ms, and the evaluation was carried out by seven evaluators. The evaluation criterion here is whether or not each evaluator felt that "the light is clearly dark or hard to notice" in Sections A and B. When the evaluation results of these evaluators were averaged, a value of t11min=40 ms was obtained. From this result, it is understood that the preferred minimum value of the total time T1 of Sections A and B which is from time point 0 to time point t11 is 40 ms.

Time t12max shows the result of evaluating the preferred value as the maximum value of the end time point t12 in Section C (the third section) while time point t11 is fixed at 100 ms. Here, time point t12 was increased from 460 ms in increments of 10 ms, and the evaluation was carried out by seven evaluators. The evaluation criteria here is whether or not each evaluator felt that "the flashing of light is clearly hard to recognize" in Section C. When the evaluation results of these evaluators were averaged, a value of t12max=596 ms was obtained. From this result, it is understood that the preferred maximum value of time T2 in Section C which is from time point t11 to time point t12 is 496 ms (=596 ms−100 ms).

Time t11max is the result of evaluating the preferred maximum value at the end time point t11 of Section B while time point t12 is fixed at 460 ms. Here, time point t11 was increased from 100 ms in increments of 10 ms, and the evaluation was carried out by seven evaluators. The evaluation criterion here is whether or not each evaluator felt that the light "does not seem to gradually disappear (gradual decrease of amount of light)" in Section C where the time length becomes relatively short as time point t11 increases. When the evaluation results of these evaluators were averaged, a value of t11max=340 ms was obtained. From this result, it is understood that the preferred minimum value of time T2 in Section C which is from time point t11 to time point t12 is 120 ms (=460 ms−340 ms). In other words, from this result, it is preferable that the minimum value of time T2 of Section C be equal to or greater than three times the minimum value of the total time T1 of Sections A and B.

Time t12min is the result of evaluating the preferred minimum value at the end time point t12 of Section C while time point t11 is fixed at 100 ms. Here, time point t12 was decreased from 460 ms in increments of 10 ms, and the evaluation was carried out by seven evaluators. The evaluation criterion here is whether or not each evaluator felt that the light "does not seem to gradually disappear (gradual decrease of amount of light)" in Section C where the time length becomes relatively short as time point t12 decreases. When the evaluation results of these evaluators were averaged, a value of t12min=260 ms was obtained. From this result, it is understood that the preferred minimum value of time T2 in Section C which is from time point t11 to time point t12 is 160 ms (=260 ms−100 ms). In other words, from this result, it is preferable that the minimum value of time T2 of Section C be equal to or greater than four times the minimum value of the total time T1 of Sections A and B.

In the above evaluation, the time length of one cycle was set to 667 ms (corresponding to a frequency of 1.5 Hz), but the time length of one cycle can be set ranging from 500 ms (corresponding to a frequency of 2 Hz) to 1000 ms (corresponding to a frequency of 1 Hz) where the above-stated preferred values remain effective. This is because even when the time length of one cycle changes, the time corresponding to the difference between the time length of one cycle and the total time (T1+T2) of Sections A to C can be set as the time length of time T3 of Section D (the fourth section).

According to the embodiment as described above, since the luminous intensity of the light emitted from each lamp unit decreases gradually within a certain common period after the luminous intensity reaches the maximum value (or an arbitrary value smaller than the maximum value), a sense of discomfort felt by the observer which is likely to occur when the plurality of LEDs is simply driven can be alleviated, and a blinking light emission expression friendly to the observer's eyes and superior in its visibility is obtained. Further, since it is possible to change the way light transitions from light-on state to light-off state without substantially changing the area of the light emitting surface within one light source, the location where the light intensity becomes the maximum value changes within the light emitting surface and a new blinking light emission expression can be obtained.

It should be noted that this invention is not limited to the subject matter of the foregoing embodiment, and can be implemented by being variously modified within the scope of the present invention as defined by the appended claims. For example, although the above embodiment exemplifies the case of driving three lamp units, at least two lamp units are sufficient and four or more lamp units is also acceptable. Further, in the above-described embodiment, although a direction indicator (turn signal lamp) was shown as an example of a vehicular lamp, the scope of this invention is not limited to such application.

In addition, it is sufficient that each lamp unit includes one or more LEDs (semiconductor light emitting elements), and in the case of having a single LED, each lamp unit illustrated in FIGS. 2A to 2F may be configured by providing a light guide member, etc. Further, in the case of having a plurality of LEDs, they can be configured to be spaced from one another, and can be configured using any well-known art.

What is claimed is:

1. A lighting control device for a vehicular lamp which is used as a direction indicator configured to control the on/off of a light source having a plurality of lamp units each having a semiconductor light emitting element comprising:
    a control part that generates and outputs a control signal for controlling emitted light of the plurality of lamp units of the light source; and
    a light source drive part for driving the plurality of lamp units of the light source based on the control signal provided from the control part;
    wherein each of the plurality of lamp units has at least a first lamp unit and a second lamp unit, and
    wherein each of the first lamp unit and the second lamp unit is driven by the light source driving part based on the control signal such that;
        before the beginning of a common period, at substantially the same time, each luminous intensity of the first lamp unit and the second lamp unit becomes a first value which is luminous intensity 100% and maintains the first value,
        during the common period, each luminous intensity of the first lamp unit and the second lamp unit decreases from the first value to a second value which is luminous intensity 0%, and
        during the common period, each
    luminous intensity gradually decreases to the second value maintaining the relationship that the luminous intensity of the first lamp unit is lower than the luminous intensity of the second lamp unit.

2. The lighting control device for a vehicular lamp according to claim 1:
wherein the lights emitted from the first lamp unit and the second lamp unit are such that;
the luminous intensity of the first lamp unit starts to gradually decrease from the first value at a first time point within the common period,
at a second time point which follows the first time point, the luminous intensity of the second lamp unit starts to gradually decrease from the first value, and
at a third time point which follows the second time point, the luminous intensities of the first lamp unit and the second lamp unit reach the second value.

3. The lighting control device for a vehicular lamp according to claim 2: wherein the shape of the waveforms when the luminous intensity of each of the first lamp unit and the second lamp unit gradually decreases are curvilinear or linear.

4. The lighting control device for a vehicular lamp according to claim 1:
wherein the lights emitted from the first lamp unit and the second lamp unit are such that;
the luminous intensities of both the first lamp unit and the second lamp unit start to gradually decrease from the first value at a first time point within the common period,
at a second time point which follows the first time point, the luminous intensity of the first lamp unit reaches the second value, and
at a third time point which follows the second time point, the luminous intensity of the second lamp unit reaches the second value.

5. The lighting control device for a vehicular lamp according to claim 4: wherein the shape of the waveforms when the luminous intensity of each of the first lamp unit and the second lamp unit gradually decreases are curvilinear or linear.

6. The lighting control device for a vehicular lamp according to claim 1:
wherein the lights emitted from the first lamp unit and the second lamp unit are such that;
the luminous intensities of the first lamp unit and the second lamp unit start to gradually decrease from the first value at a first time point within the common period,
the luminous intensities of the first lamp unit and the second lamp unit gradually decrease while the luminous intensity of the first lamp unit decreases relatively quickly and the luminous intensity of the second lamp unit decreases relatively slowly, and
at a second time point which follows the first time point, the luminous intensities of the first lamp unit and the second lamp unit reach the second value.

7. The lighting control device for a vehicular lamp according to claim 6: wherein the shape of the waveforms when the luminous intensity of each of the first lamp unit and the second lamp unit gradually decreases are curvilinear or linear.

8. The lighting control device for a vehicular lamp according to claim 1:
wherein the shape of the waveforms when the luminous intensity of each of the first lamp unit and the second lamp unit gradually decreases are curvilinear or linear.

9. A vehicular lamp system comprising:
the lighting control device for a vehicular lamp according to claim 1, and a light source controlled by the lighting control device.

* * * * *